United States Patent [19]

Claar et al.

[11] Patent Number: 5,254,996
[45] Date of Patent: Oct. 19, 1993

[54] CHARGE MONITORING SYSTEM FOR A REMOTE CONTROL SYSTEM

[75] Inventors: Klaus Claar, Gechingen; Martin Lindmayer, Leonberg, both of Fed. Rep. of Germany

[73] Assignee: Mercedes-Benz AG, Fed. Rep. of Germany

[21] Appl. No.: 786,174

[22] Filed: Oct. 31, 1991

[30] Foreign Application Priority Data

Nov. 29, 1990 [DE] Fed. Rep. of Germany ....... 4038038

[51] Int. Cl.$^5$ .................. G08C 19/12; B60R 25/10
[52] U.S. Cl. .................. 341/176; 340/426; 340/636
[58] Field of Search .......... 341/176; 340/636, 426, 340/825.31, 825.69, 825.72; 307/10.2; 235/382; 455/67.1, 67.7; 70/256–257; 180/287, 289; 320/48; 324/433, 435, 437

[56] References Cited

U.S. PATENT DOCUMENTS

| | | | |
|---|---|---|---|
| 3,936,833 | 2/1976 | Bush | 341/176 |
| 4,177,426 | 12/1979 | Gaishin et al. | 340/825.69 |
| 4,363,407 | 12/1982 | Buckler et al. | 340/636 X |
| 4,439,736 | 3/1984 | Schwartz | 324/437 |
| 4,581,606 | 4/1986 | Mallory | 340/539 |
| 4,622,544 | 11/1986 | Bially et al. | 340/636 |
| 4,737,784 | 4/1988 | Hirano | 340/825.31 |
| 4,811,013 | 3/1989 | Akutsu | 340/825.31 |
| 4,916,613 | 4/1990 | Lange et al. | 364/400 |

FOREIGN PATENT DOCUMENTS

| | | |
|---|---|---|
| 3043627 | 7/1982 | Fed. Rep. of Germany . |
| 3109577 | 10/1982 | Fed. Rep. of Germany ...... 340/426 |
| 3314072 | 10/1984 | Fed. Rep. of Germany . |
| 3421540 | 1/1986 | Fed. Rep. of Germany . |
| 3446245 | 6/1986 | Fed. Rep. of Germany . |
| 3613858 | 10/1987 | Fed. Rep. of Germany . |
| 2545632 | 11/1984 | France ................. 340/426 |

OTHER PUBLICATIONS

Mot-Service-Magazin, "Endlich GewiBheit", p. 157, Sep. 1990.

*Primary Examiner*—John K. Peng
*Assistant Examiner*—Thomas J. Mullen, Jr.
*Attorney, Agent, or Firm*—Evenson, McKeown, Edwards & Lenahan

[57] ABSTRACT

A remote control system has a transmitter, a current storage device feeding its triggerable control signals, an external receptacle into which the transmitter can be inserted, and a charge monitoring device with charge-state indicator. The charge monitoring device with charge-state indicator is assigned to the receptacle and preferably causes the transmitter to automatically transmit a control signal after being inserted into the receptacle. Via the charge monitoring device, the charge state of the transmitter can be evaluated independently of the voltage supply from the current storage device of the transmitter either directly via its voltage supplied under load or indirectly via the intensity of the control signal emitted by it, and be indicated if respective minimum values are undershot. The system is suitable for remotely controlling motor-vehicle security devices.

22 Claims, 2 Drawing Sheets

CHARGE MONITORING SYSTEM FOR A REMOTE CONTROL SYSTEM

BACKGROUND AND SUMMARY OF THE INVENTION

The invention relates to a remote control system and, more particularly, to a remote control system containing a transmitter having a current storage device and a transmit key. An operator actuates the transmitter for the transmission, when desired, of control signals fed from the current storage device. The remote control system includes a charge monitoring device for monitoring the charge state of the current storage device. The charge monitoring device has a charge-state indicator for generating a signal directed at the operator. The remote control system also contains a receptacle for inserting the transmitter and making contact between the transmitter and an element connected downstream of the receptacle.

A known remote control system with these features is described in German Patent Document DE 33 14 072 C2 and is provided, in particular, for the remote control of a lock system for the mechanical and electronic control of vehicle locks. Its hand-held transmitter has a separate charge monitoring device with indicator and also has power pick-up contacts for making electrical contact with the vehicle electrical system. The pick-up contacts, when plugging the transmitter into a specially provided receptacle inside the vehicle, e.g., on the ignition lock, are electrically connected to corresponding connection contacts of the receptacle. When making contact with the connection contacts in the receptacle or by pressing its transmit key, the transmitter is made to transmit a control signal via its signal output into the receptacle, which signal is evaluated by a receiving device.

The reference describes nothing further regarding the mode of operation of the charge-state indicator of the class-forming remote control system. However, it is customary that, when actuating the transmitter, the charge state indicator is activated if the charge state of the current storage device is still sufficient, and thus constitutes an active state monitoring facility.

A device for preventing unauthorized use of a vehicle is known from German Patent Document DE 30 43 627 C2 which also contains a transmitter for the wireless transmission of control signals and a separately provided transmitter receptacle in the passenger compartment of the vehicle. If the transmitter is inserted into this receptacle into which an optical cable leads, its transmit key can be automatically actuated by a cam arranged in the receptacle in the movement path of the transmit key so that a control signal is emitted by the transmitter and transmitted into and via the aforesaid optical cable. In the known device, this automatically emitted control merely serves for canceling or unlocking a lock provided for an element which is essential for the operation of the vehicle. The lock is controlled by output signals of a receiving device connected to the optical cable on the other side and tuned to the control signals of the transmitter.

The aforesaid simple mechanical forced triggering of a transmitter signal, by means of a cam, cannot be applied to a transmitter having a transmit key that is flush with the outer case of the transmitter itself when inactive and whose actuating device is at an angle to the direction in which the transmitter is inserted into the receptacle.

In the system mentioned above, the transmitter only optionally has a separate current storage device. In the publication DE 33 14 072 C2 mentioned above, no statement is given concerning a charge-state monitoring facility with indicator.

The transmitter, i.e. a hand-held transmitter, of a further known remote control system described in DE 34 46 245 A1 also contains a charge monitoring device for the charge state of its current storage device. The charge monitoring device is triggered in the event of the actuation of the transmitter and a subsequently internally detected low residual charge of the current storage device and generates a visual or audible warning signal directed at the operator. This system contains no vehicle-internal receptacle for the transmitter.

Battery testing devices are known, e.g. DE-Z mot Service-Magazin, issue 20, Sept. 14, 1990, page 157, which measure the charge state, e.g. of motor-vehicle lead accumulators, and also displays the charge state.

There is therefore needed a remote control system of the above-mentioned type having a device external to the transmitter device for testing the charge state of the current storage device and, if appropriate, generating a warning signal.

The need is met according to the present invention by a remote control system containing a transmitter having a current storage device and a transmit key. The transmitter is actuated by an operator for the transmission, when desired, of control signals fed from the current storage device. The remote control system includes a charge monitoring device for monitoring the charge state of the current storage device. The charge monitoring device has a charge-state indicator for generating a signal directed at the operator. The remote control system also contains a receptacle for inserting the transmitter and making contact between the transmitter and an element connected downstream of the receptacle. The charge monitoring device and the charge-state indicator are arranged outside the transmitter. The charge monitoring device is connected downstream of the receptacle. The charge state of the current storage device is monitored by the charge monitoring device with the transmitter inserted into the receptacle and actuated inside the latter. The charge-state indicator is activated at a charge state of the current storage device.

By assigning the charge monitoring device to an external receptacle for the transmitter of the remote control system, into which receptacle the transmitter can be inserted and in which contact is made with it either electrically or by means of a control signal, and by activating the associated visual and/or audible charge-state indicator when the transmitter is actuated inside the receptacle in the event of an insufficient charge state of the current storage device of the transmitter, a reliable monitoring of its capacity is obtained without having to provide in the transmitter itself a device which takes up installation space at least with respect to the charge-state indicator.

Furthermore, in this case, the functioning of the charge-state indicator is not dependent on the residual capacity of the current storage device but rather the warning indicator is fed from an external source.

A variant of the capacity or charge-state monitoring device uses the energy pick-up contacts, known per se, of the transmitter and the connection contacts, corresponding thereto, of the receptacle for making direct electrical contact between the transmitter or its current storage device and the charge monitoring device and for measuring voltage and/or power of the current storage device by means of the charge monitoring device. Here, it is not absolutely necessary to also actuate the transmitter. However, it may be equally appropriate to measure the state of the current storage device during an actuation of the transmitter, i.e. when under load.

A different variant uses an indirect detection, in that, contact is made between the transmitter and the charge monitoring device connected downstream of the receptacle only indirectly via the contactless transmission of the transmitter's control signals. Here, the intensity of the control signal emitted by the transmitter during its actuation in the receptacle is detected. If this intensity should undershoot a threshold value, it is concluded that failure of the current storage device or of its charge is imminent and a warning signal is generated.

In the intensity evaluation, the absolute value of the received signal intensity can be detected, for example, by measuring the voltage (in the case of infrared transmission the photoelectric voltage) generated by the reception in the receiver of the emitted control signal, and comparing it with a reference or threshold value. The charge-state indicator is switched on when this value is undershot.

In the present case, it is to be considered additionally that the transmitter is used generally at a relatively large distance from the corresponding receiver, for example, for the remote control of a vehicle lock or also of a different remote-controllable element. However, if the transmitter is used in the receptacle, wherein its output, for example an infrared transmitting diode, is located in essentially the direct vicinity of a receiver, there is consequently in principle—with a well-charged current storage device—an excess of intensity with respect to the other aforesaid applications.

In accordance with a further advantageous feature of the invention, a filter can therefore be installed, especially in view of the generally preferred infrared-light transmission of the control signals, in a manner known per se from German Patent Document DE 36 39 715 A1. The filter is installed between the transmitter signal output and the receiver, which slightly weakens the intensity of the control signals, which can still be received behind the filter, in comparison with the emitted intensity. As a result, the aforesaid intensity excess is in all cases partially reduced in a selected fashion. An equivalent design is of course also possible in principle, even when using other transmission media, for example radio or ultrasound.

The charge-state indicator can thus be activated when the transmitter is located in the receptacle and has also been actuated but, in spite of this, no signal could be detected by the receiver.

By selective selection of the filter effect or of the degree of filtering or damping, the desired warning threshold value or the reference intensity excess to be tested can be varied within wide limits.

The main advantage of such an arrangement consists in the fact that an actual threshold value evaluation is no longer required since it is simply concluded that discharging of the current storage device has occurred from the face that no signal is received despite transmitter actuation.

Other features relate to the triggering of a control signal emission of the transmitter which is inserted into the receptacle. Of course, it would in principle be possible to wait before the detection of the state to determine whether or when the operator of the transmitter manually activates it.

Preferred variants will then already automatically actuate the transmitter in a suitable manner when it is inserted into the receptacle or only after a timing interval following the plug-in process.

This is simplest with a transmitter whose transmit key can be actuated in a direction parallel to the plug-in direction and is located at the front in the plug-in direction because the key can then be pushed against a corresponding projection in the receptacle.

Of course, for the simultaneous charge-state monitoring by means of the signal intensity another device is necessary which detects the presence of the transmitter in the receptacle in case the charge of the current storage device should no longer be sufficient for the generation of an evaluatable signal.

This can also operate via the receiving contacts, known per se, of the receptacle.

However, in addition to or instead of the detection via the aforesaid receiving or connection contacts, a separate detection device can be provided. The separate detection device operates, for example, mechanically or electrically. Possible solutions are electromechanical keys which project into the receptacle and are actuated when the transmitter is plugged in, it being possible for an actuation tappet to be driving, for example, via an actuating element, which tappet itself acts on the transmit key of the transmitter.

Purely mechanical solutions, for example with a spring-loaded switching sensor and an actuation tappet connected mechanically thereto and acting on the transmit key of the transmitter are also possible for the combined detection of the presence of and forced triggering of a transmitter signal in the receptacle.

A further interesting variant is contactless, in particular inductive or capacitive, detection of the transmitter in the receptacle. In this way, on the one hand its presence can be detected and on the other hand, in a manner known per se from German Patent Document DE 35 01 482 A1, the transmitter can be made to emit automatically a control signal whose intensity can then be detected in the above-describe manner.

Finally, it is also to be noted that a photoelectric barrier can be used for detecting the presence of the transmitter in the receptacle.

In a motor vehicle-specific solution of the type mentioned above, in which an active sensor for presence detection is fed from the electrical system of the vehicle and is provided in the receptacle which will be located, for example, in the dashboard of the vehicle, it is of course advisable in view of the limited capacity of the vehicle battery not to switch on the respective sensor until the vehicle is unlocked. It is known that such unlocking can also be controlled by means of the remote control system transmitter in question.

With a transmitter which is combined in a known manner with a mechanical (ignition) key, the presence detection, the triggering of signals and the charge-state monitoring could be carried out as further variants in conjunction with and as a function of the key actuation of a cylinder lock serving as the receptacle.

Other objects, advantages and novel features of the present invention will become apparent from the following detailed description of the invention when considered in conjunction with the accompanying drawings.

DETAILED DESCRIPTION OF THE DRAWINGS

Figure 1:
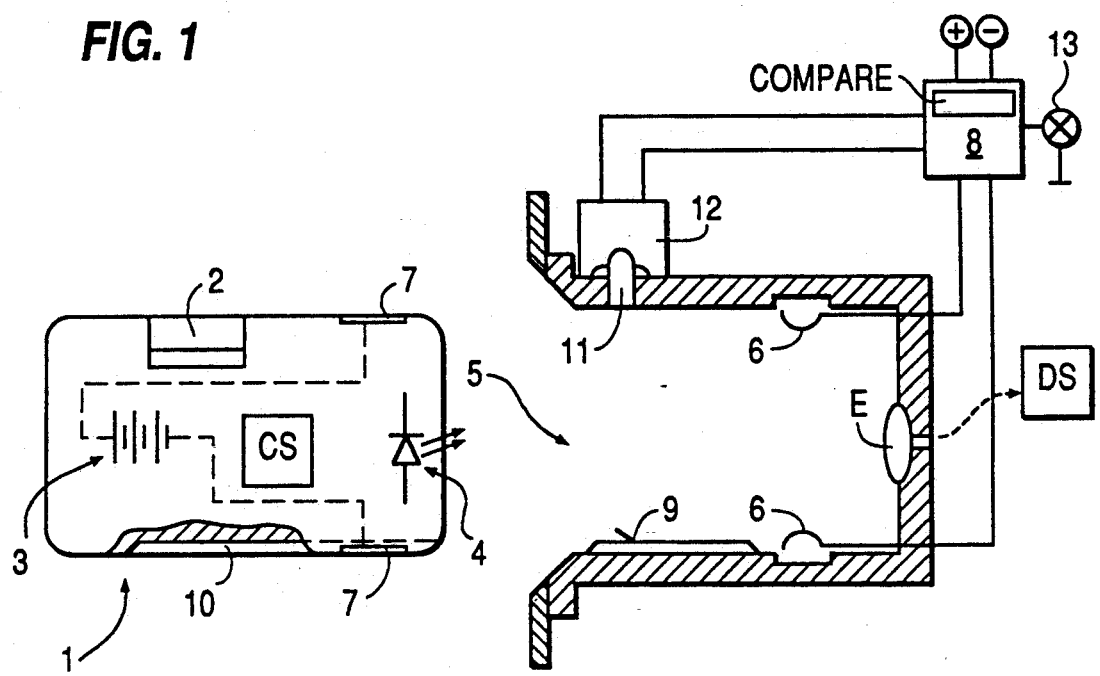
FIG. 1 is a schematic diagram of a first embodiment in which a charge-state monitoring device of the remote control system, provided for detecting the voltage of the current storage device, is assigned downstream of a receptacle for a transmitter.

Referring to FIG. 1, in a remote control system, there is shown a portable (hand-held) transmitter 1 having a transmit key 2 which terminates flush with its outer case, a built-in current storage device 3 and an output 4 for generating encoded control signals and for transmitting them in a contactless manner to correspondingly tuned receivers. There are many varied applications for systems of this kind, the operation of electronic entertainment devices, measuring equipment, vehicle elements and, in this particular case, vehicle locks and anti-theft devices, to name only a few.

The most common embodiments of these systems currently employ a signal transmission by means of infrared beams. The output 4 of the transmitter 1 then consists of an infrared transmitting diode diagrammatically indicated here by way of example. The transmitter 1 usually also contains a device, for example a code memory CS, for modulating the control signals to be emitted via the output 4.

Other remote control systems operate with radio or ultrasonic transmission of the control signals. These embodiments can be considered as equivalent with regard to the aspects relevant here.

As a result of the small constructional size of the transmitter 1, which is designed such that it should be possible to insert it, for example, into the pockets of the respective operator, the capacity of its current storage device 3 is limited. Therefore, in a vehicle, a receptacle 5—only indicated here in a simplified manner—is provided for the transmitter 1 into which the transmitter can be inserted during the operation of the vehicle.

In the receptacle 5, the transmitter 1 can be brought into contact with an element arranged downstream of it. This can be understood to be both the electrical system of the vehicle, e.g. batter, generator, etc., and such other elements as can be controlled in a known manner b control signals of the transmitter 1 transmitted into the receptacle 5. Such an element is indicated here only symbolically and could be realized for example as an anti-theft device DS which, inter alia, contains a receiving device tuned to receive the control signals of the transmitter 1. In the case of the infrared-light transmission as present here, the device DS is connected to the receptacle 5 via a focusing lens E and, for example, an optical cable.

In a first variant of the contacting of the transmitter 1 in the receptacle 5 for the purpose of the charge-state monitoring of the current storage element 3, the receptacle 5 has receiving contacts 6 which correspond to connection contacts 7 of the transmitter 1. The receiving contacts 6 are electrically connected via a charge monitoring device 8 to the electrical system—indicated only by symbols "+" and "−"—of the vehicle. The connection contacts 7 of the transmitter are connected to the current storage device 3 of the transmitter by internal connections indicated by broken lines. By means of the mutually adjoining receiving contacts 6 and connection contacts 7 (as shown in FIG. 2), for example, an accumulator used as a current storage device 3 can be charged from the vehicle electrical system in a known manner.

Of course, it is ensured by means of a suitable dimensional encoding of the receptacle 5 and transmitter 1, indicated merely by way of example as a groove 10 and tongue 9 pairing, that the transmitter can only be inserted into the receptacle 5 in a specific direction and position.

In order to cause the transmitter 1, which can be inserted into the receptacle 5, to automatically transmit a control signal, there is arranged on the receptacle 5 an actuating tappet 11 which penetrates the receptacle wall. An actuating element 12 which, for example, operates electromagnetically, is provided to lift up the tappet and can be activated by the charge monitoring device 8.

Figure 2:
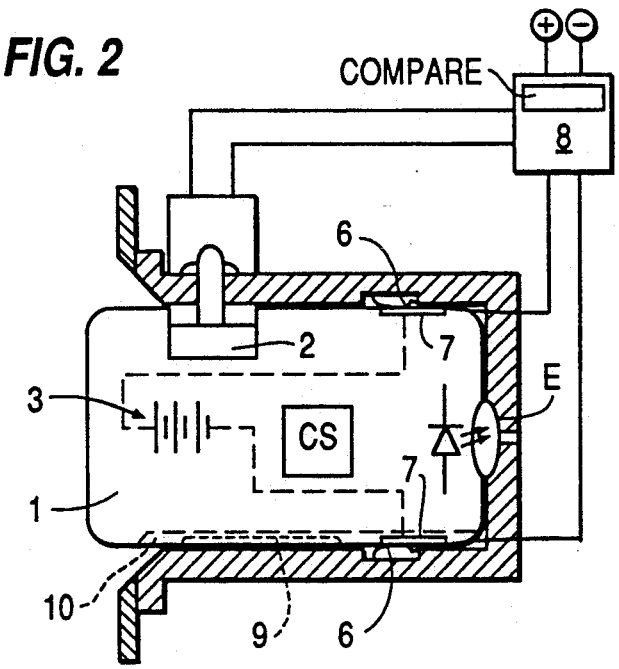
FIG. 2 is a schematic diagram of the embodiment according to FIG. 1 with a transmitter which is inserted into the receptacle and activated automatically therein to emit a control signal.

In order to determine the charge state of the current storage device 3 under load, the presence of the current storage device—illustrated in FIG. 2—in the receptacle 5 is automatically detected by the charge monitoring device 8. This is readily possible e.g. by detecting the electrical connection or change in resistance which then exists between the receiving contacts 6 by means of the current storage device 3. Preferably with a small timing delay which ensures that the transmitter 1 can still be inserted into the receptacle 5 as far as the stop, the transmit key 2 of the transmitter 1 is automatically depressed for a brief period by the actuation tappet 11 of the actuating element 12. As a result, the transmitter 1 emits via its output 4 a control signal which loads the control storage device 3 as when in operation. Of course, the transmitter 1 is secured in the receptacle 5 by engagement means (not illustrated in greater detail). In order to remove the transmitter 1, either the transmitter can still protrude a certain distance out of the receptacle as illustrated, so that it can be manually grasped, or a separate ejection key, as known for example from telephone card devices, can be provided if the transmitter is to fit flush into the receptacle.

In addition, if an actuating element for the automatic activation of the transmitter is already present in the receptacle 5, a further manual switch (not illustrated) is provided for the operator to activate the actuating element when desired, if required, the manual switch can activate the charge monitoring device.

It is also self-evident that, instead of the described mechanical triggering using the transmit key 2 by means of the actuation tappet 11, the transmitter 1 can also be made to transmit a control signal into the receptacle 5, in a corresponding embodiment known per se:

1) at the moment of the electrical contacting of the transmitter and receptacle or 2) by means of an activation pulse fed via the receiving contacts 6 and the connection contacts 7 and triggered by the charge monitoring device 8.

In any case, the charge monitoring device 8 contains a comparator circuit. The electrical voltage supplied by the current storage device 3 is applied to the comparator circuit, at the latest at the moment of actuation, when the actuation tappet 11 acts on the transmit key 2. The comparator circuit compares this voltage with a reference value or minimum value. A threshold value switch, for example, is suitable as a component of the comparator circuit, it being intended that the reference value or minimum value of the switch be adjustable, for example, by means of a potentiometer.

If the supplied voltage of the current storage device 3 should lie below the minimum value, the charge monitoring device 8 activates a charge-state indicator 13 assigned to it, for example the incandescent lamp illustrated here, an LED or a suitable audible indicator, the vehicle electrical system serving as a source for operating it.

The charge-state indicator 13 could of course also be switched on as early as when the current storage device 3 is connected via the connection contacts 7 of the transmitter and the receiving contacts 6 to the charge monitoring device 8 and the voltage then applied to the latter is already below the minimum value even without a load.

Figure 3:
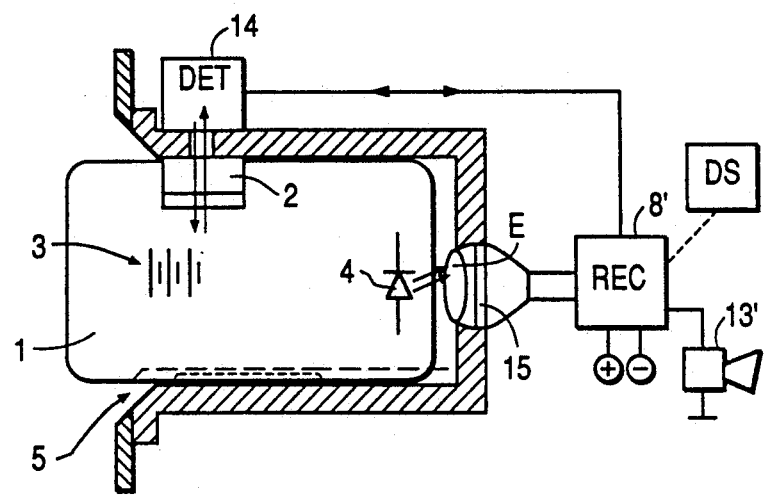
FIG. 3 is a schematic diagram of a second embodiment in which a charge-state monitoring device of the remote control system, provided for detecting the intensity of a control signal transmitted by the transmitter into the receptacle, is assigned downstream of the receptacle for the transmitter.

In FIG. 3, a different embodiment is illustrated which detects and evaluates the charge state of the current storage device 3 of the transmitter indirectly by means of a measurement or detection of the intensity of a control signal transmitted by the latter into the receptacle 5.

As far as possible, identical reference symbols were used for identical components in FIGS. 1 and 2.

It is to be noted that also in this embodiment, the transmitter 1 could be made to transmit automatically a control signal in a manner already described above when its presence in the receptacle 5 is determined. To this extent, the two embodiments illustrated are compatible and replaceable.

However, a contactless, for example inductively, capacitively or optically acting detection device 14 (approach sensor or detector) o the receptacle 5 is diagrammatically illustrated here. The detection device 14 could itself of course also be combined with the embodiment according to FIGS. 1 and 2. During the forced insertion of the transmitter 1 into the receptacle 5 in the correct position, the detection device 14 generates an electrical detection signal and feeds it to a receiving device REC which is connected downstream of the receptacle 5, is tuned to receive the control signals of the transmitter 1 and, in this embodiment, is to be directly considered also as a charge monitoring device 8' with charge-state indicator 13' connected downstream of it or comprising the latter. The receiving device REC in turn activates the transmitter 1 at the same time as the presence detection or a short time later—the time period is determined internally, for example by a timing element—in a manner not illustrated in greater detail, by means of the detection device 14.

The bidirectional electrical relationship between transmitter 1, detection device 14 and receiving device REC is indicated by double arrows pointing in opposite directions.

For this purpose, the aforesaid inductive or capacitive proximity sensors can also be constructed as transmitting devices especially for the contactless activation of the transmitter 1, for which purpose the transmitter of course has to be provided with a tuned receiving and triggering device.

For example, a reflex photoelectric barrier whose received reflex light signal changes under the effect of the plugging-in of the transmitter 1 into the receptacle 5 can be used as optical detection device. In such a case, the transmitter 1 could be equipped with a receiving diode or the like which is tuned to this reflex photoelectric barrier and actuates an internal triggering device of the transmitter 1 in response to a specific light signal or a signal sequence.

There are in turn a plurality of possible embodiments of the receiving device REC/charge monitoring device 8' with respect to the execution of the charge state monitoring of the current storage device 3. On the one hand, it can contain a comparator circuit, analogously with the method already described in conjunction with FIG. 2, which circuit compares the electrical voltage which is generated when a control signal of the transmitter 1 is received and is approximately proportional to the intensity of the received signal, with a minimum value. This variant is not explicitly illustrated here.

If the aforesaid electrical variable is below the minimum value, the charge-state indicator 13'—illustrated in FIG. 3 as an audible signal generator—is activated.

On the other hand, a particularly simple and advantageous method is diagrammatically illustrated in FIG. 3. Provided between the output 4, located in the receptacle 5, of the transmitter 1 and the receiving device REC is a filter 15 which attenuates by a specific degree the intensity of each control signal transmitted by the output 4, so that the intensity of the signal which can still be received and evaluated by the receiving device REC is smaller in a defined manner than the intensity of the transmitted signal.

Without any comparator circuit or the like in the receiving device REC/charge monitoring device 8', the latter can then activate the charge-state indicator 13' to warn of failure of the current storage device (and if required to request its replacement) if the transmitter 1 is inserted into the receptacle 5 and is automatically actuated there and the receiving device REC nevertheless does not receive any further signal which can be evaluated.

In the embodiment described above and illustrated in FIG. 3, it can be seen that no receiving contacts are present in the receptacle 5 and the transmitter 1 does not have any connection contacts because they are not required for this embodiment. Of course, such contacts, but corresponding to FIGS. 1 and 2, can be provided, for example, for loading the current storage device 3.

Figure 4:
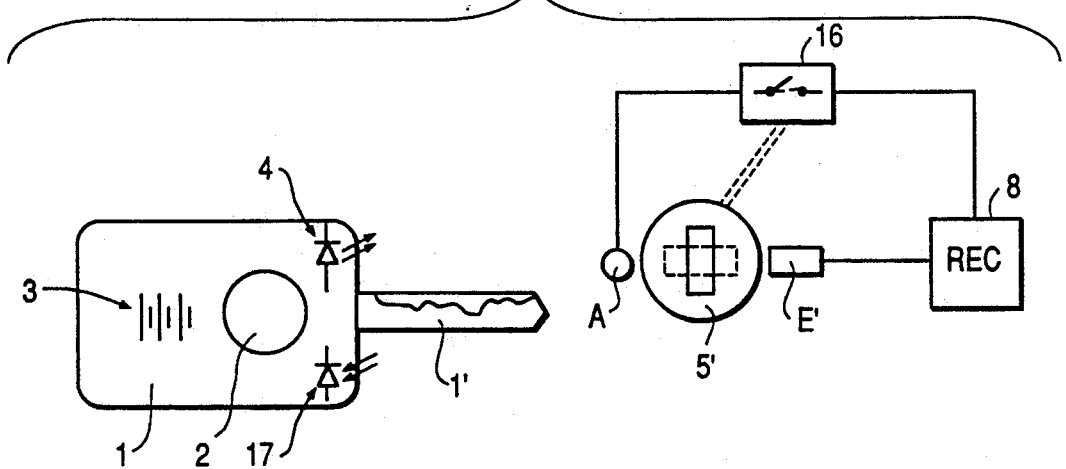
FIG. 4 is a schematic diagram of a portion of a third embodiment having a transmitter which is combined with a mechanical key and a receptacle designed as a cylinder lock.

Portions of a third variant with a transmitter 1, which is combined in a known manner with a mechanical key 1', and with a receptacle 5' designed as a lock cylinder are shown in FIG. 4. Here, the presence of the transmitter 1 in the receptacle 5' is electrically detected by mechanically turning the lock cylinder by means of the key 1' out of the withdrawn position, indicated by broken lines, by means of a switching device 16 coupled to the lock cylinder, and the charge monitoring device 8 is also activated.

The transmitter 1 again has an output 4 and additionally a triggering input 17 (indicated as transmitting diode or receiving diode). The receptacle 5' is spatially assigned a signal input E' and a control output A'. In the position of the lock cylinder which is rotated with the transmitter 1 or key 1' inserted, the output 4 of the transmitter 1 is located directly opposite the signal input E' and the triggering input 17 directly opposite the control output A.

It is evident that in the simple embodiment the mechanical key cannot always be designed as a turning key; however, this would be possible if, for example both an input E' and an output A were mounted on both sides of the lock cylinder or were combined with one another in a suitable manner.

The output A is briefly activated in a manner not described in greater detail by means of the actuated switching device 16, in order to cause, in a contactless fashion, the transmitter 1 to transmit a control signal in the manner already described. At the same time, the receiving device REC, connected downstream of the receptacle 5' or its signal input E' is fed a signal from the switching device 16, which signal causes the said switching device 16 to test the intensity of the control signal transferred to it from the output 4 of the transmitter 1 via the signal input E' according to one of the methods already described with reference to FIG. 3.

On the other hand, it would also be in principle possible with the shape of the receptacle shown in FIG. 4 to make contact, analogously with FIGS. 1 and 2, between the transmitter or its current storage device and an element, which is connected downstream of the receptacle, via a contact pairing formed, for example, by sliding contacts.

Finally, it is also to be noted that if the operator can voluntarily make the transmitter inserted into the receptacle to transmit a control signal via the transmitter's transmit key or via the additional manual switch already mentioned, an activation of the charge monitoring device can be provided for the direct testing of the charge state of the current storage device (voltage level) by the control signal itself via the receiving device if the receptacle has a receiving device connected downstream of it in the described manner and the transmitter is electrically connected thereto via contact pairs in accordance with FIGS. 1 and 2. As a result, a quasi-automatic direct charge-state monitoring is obtained with each routine actuation of the inserted transmitter. This procedure is recommended in any case for the indirect monitoring, also described, by means of the received signal intensity. However, in both cases it is dependent on a sufficient charge state of the current storage device.

The procedures described in detail above are principally suitable for continuous checking of the charge state of the current storage device of a transmitter used predominantly for the remote control of motor-vehicle locking devices and anti-theft devices because the operator must be able to rely on the correct functioning and execution of the security instructions issued by means of the transmitter, especially on leaving his vehicle.

However, notwithstanding the above, for the other applications already mentioned, a convenient means of charge-state monitoring and, if required, requesting the replacement of the current storage receptacle is also obtained, since even in an entertainment electronics device or in a measuring device a receptacle for the transmitter can of course be arranged in the manner described above.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A remote control system, for an operator, comprising:
  a transmitter having a current storage device and a transmit key, said current storage device maintaining an actual charge state, said transmitter being operator activated to transmit control signals fed from said current storage device;
  a charge monitoring device having a charge state indicator, said charge monitoring device monitoring the actual charge state of said current storage device and said charge state indicator generating signals directed at the operator;
  a receptacle into which said transmitter is inserted, said receptacle making contact between said transmitter and an element downstream of said receptacle,
  wherein said charge monitoring device and said charge state indicator are arranged separate from said transmitter, said charge monitoring device being operatively connected downstream of said receptacle and further wherein the actual charge state of said current storage device is monitored by said charge monitoring device when said transmitter is inserted into and actuated within said receptacle, said charge state indicator being actuated when the actual charge state of the current storage device is below a minimum value.

2. A remote control system according to claim 1, further comprising:
  receiving contacts located in the receptacle;
  connection contacts located on the transmitter, said connection contacts being connected to said current storage device and through which said transmitter is electrically connected to said element connected downstream of said receptacle;
  means for inserting said transmitter into aid receptacle in a predetermined direction and position; and
  wherein said charge monitoring device, connected downstream of the receptacle, is connected to said receiving contacts and wherein the charge state of the current storage device is monitored by said charge monitoring means through said receiving contacts and connection contacts which correspondingly contact each other when the transmitter is correctly inserted into the receptacle.

3. A remote control system according to claim 2, wherein a variable electrical parameter of the current storage device is evaluated by said charge monitoring means through the corresponding receiving contacts and connection contacts, and
  wherein the variable electrical parameter is compared with a predetermined minimum value.

4. A remote control system according to claim 3, wherein said variable electrical parameter is an electrical voltage.

5. A remote control system according to claim 2, further comprising:
  actuation means for automatically causing the transmitter to transmit a control signal after the transmitter is inserted into the receptacle.

6. A remote control system according to claim 2, wherein when the transmitter is inserted into the receptacle a control signal is automatically transmitted in the direction of a receiving device tuned to receive the control signal of the transmitter and connected downstream of the receptacle, wherein the charge monitoring device is activated by the generated control signal via the receiving device.

7. A remote control system according to claim 1, further comprising:
   a receiving device connected downstream of the receptacle and tuned to receive the control signals of the transmitter;
   wherein the charge monitoring device, connected downstream of the receptacle, is connected to the receiving device for detecting the intensity of a control signal received by the receiving device; and
   wherein the charge-state indicator is actuated if the intensity of a control signal generated by the transmitter located in the receptacle undershoots a specific value.

8. A remote control system according to claim 7, wherein a variable electrical parameter generated upon reception of a control signal is evaluated in the receiving device; and
   wherein the variable electrical parameter is compared with a minimum value.

9. A remote control system according to claim 8, wherein said variable electrical parameter is an electrical voltage.

10. A remote control system according to claim 7, further comprising:
    actuation means for automatically causing the transmitter to transmit a control signal after the transmitter is inserted into the receptacle.

11. A remote control system according to claim 1, further comprising:
    actuation means for automatically causing the transmitter to transmit a control signal after the transmitter is inserted into the receptacle.

12. A remote control system according to claim 11, wherein the transmitter, after its connection contacts make contact with the corresponding receiving contacts, automatically transmits a control signal.

13. A remote control system according to claim 12, further comprising:
    a timing element for activating the actuation means, said timing element presetting a specific delay time period between the time of insertion of the transmitter into the receptacle and the time when the transmitter is automatically caused to transmit a control signal.

14. A remote control system according to claim 11, further comprising:
    detection means for detecting the presence of the transmitter in the receptacle, wherein said actuation means is controlled by the detection means and operates in a non-mechanical communicating manner, for automatically causing the transmitter to transmit a control signal, the transmitter being provided with receiving means tuned to the actuation means.

15. A remote control system according to claim 14, wherein said detection means is used as said actuation means, communicating in a non-mechanical manner with the transmitter.

16. A remote control system according to claim 14, further comprising:
    a timing element for activating the actuation means, said timing element presetting a specific delay time period between the time of insertion of the transmitter into the receptacle and the time when the transmitter is automatically caused to transmit a control signal.

17. A remote control system according to claim 14, further comprising:
    a receiving device connected downstream of the receptacle and tuned to receive the control signals of the transmitter;
    a filter, connected in the receptacle upstream of the receiving device connected to the charge monitoring device, said filter being partially permeable to the control signals of the transmitter and provided to attenuate their intensity by a specific degree; and
    means for activating the charge-state indicator whenever no detectable control signal passes to the receiving device when the transmitter is inserted into the receptacle and is automatically activated.

18. A remote control system according to claim 11, further comprising:
    a timing element for activating the actuation means, said timing element presetting a specific delay time period between the time of insertion of the transmitter into the receptacle and the time when the transmitter is automatically caused to transmit a control signal.

19. A remote control system according to claim 18, further comprising:
    a receiving device connected downstream of the receptacle and tuned to receive the control signals of the transmitter;
    a filter, connected in the receptacle upstream of the receiving device connected to the charge monitoring device, said filter being partially permeable to the control signals of the transmitter and provided to attenuate their intensity by a specific degree; and
    means for activating the charge-state indicator whenever no detectable control signal passes to the receiving device when the transmitter is inserted into the receptacle and is automatically activated.

20. A remote control system according to claim 11, comprising:
    a receiving device connected downstream of the receptacle and tuned to receive the control signals of the transmitter;
    a filter, connected in the receptacle upstream of the receiving device connected to the charge monitoring device, said filter being partially permeable to the control signals of the transmitter and provided to attenuate their intensity by a specific degree; and
    means for activating the charge-state indicator whenever no detectable control signal passes to the receiving device when the transmitter is inserted into the receptacle and is automatically activated.

21. A remote control system according to claim 1, wherein the receptacle is designed as a lock cylinder and the transmitter is combined with a mechanical key to form one mechanical unit, further comprising means for activating the charge monitoring device by rotating the lock cylinder into an operating position by means of a switching device coupled to the lock cylinder.

22. A remote control system according to claim 1, wherein said system is provided for remotely controlling a motor-vehicle locking device, comprising:
    a detection device, which can be operated from the electrical system of the vehicle, for detecting the presence of the transmitter in the receptacle; and
    means for activating the detection device only after unlocking of the locking device has occurred.

* * * * *